United States Patent [19]

Nebgen

[11] 3,882,671
[45] May 13, 1975

[54] GASIFICATION METHOD WITH FUEL GAS COOLING

[75] Inventor: William H. Nebgen, Woodside, N.Y.

[73] Assignee: Brayton Cycle Improvement Associaton, New York, N.Y.

[22] Filed: Jan. 2, 1974

[21] Appl. No.: 429,531

Related U.S. Application Data

[60] Division of Ser. No. 180,282, Sept. 14, 1971, Pat. No. 3,788,066, which is a continuation-in-part of Ser. No. 34,717, May 5, 1970, Pat. No. 3,668,884, and Ser. No. 44,673, June 9, 1970, abandoned.

[52] U.S. Cl............ 60/39.02; 60/39.12; 60/39.18 B
[51] Int. Cl............................................. F02b 43/12
[58] Field of Search......... 60/39.18 B, 39.12, 39.02, 60/39.05

[56] References Cited
UNITED STATES PATENTS

| | | | |
|---|---|---|---|
| 2,592,749 | 4/1952 | Sedille et al. | 60/39.12 |
| 2,614,915 | 10/1952 | Hirsch | 60/39.12 |
| 2,675,672 | 4/1954 | Schorner | 60/39.12 |
| 2,701,443 | 2/1955 | Sedille | 60/39.12 |
| 3,002,347 | 10/1961 | Sprague | 60/39.12 |
| 3,276,203 | 10/1966 | Squires | 60/39.05 |
| 3,446,014 | 5/1969 | Foster-Pegg | 60/39.18 B |
| 3,796,045 | 3/1974 | Foster-Pegg | 60/39.02 |

FOREIGN PATENTS OR APPLICATIONS

| | | | |
|---|---|---|---|
| 21,455 | 3/1956 | Germany | 60/39.12 |
| 1,440,832 | 4/1965 | France | 60/39.12 |

Primary Examiner—C. J. Husar
Assistant Examiner—Warren Olsen

[57] ABSTRACT

An open Brayton cycle, preferably with refrigerated air intake, is operated with dirty fuel containing contaminants which are chemically corrosive to steel or which in the gasification of the fuel are tranformed into such compounds, such as coal, for example high sulfur coal, high sulfur fuel oil or fuel oil containing vanadium compounds, and the like. The dirty fuel is first gasified by partial combustion with hot air, enriched air or oxygen, dry quenched by contact with cool combustion gases to a temperature at which contaminants, such as hydrogen sulfide, are no longer corrosive to steel, cooled, preferably in a waste heat boiler, and solid and/or corrosive gaseous contaminants removed. Refrigerated atmospheric air is compressed, the compressed air heated by heat exchange with Brayton cycle turbine exhaust gas, a portion is used as combustion air in the Brayton cycle combustor and a portion used for partial oxidation of the dirty fuel, the combustor receiving cool, clean gas from the partial oxidation and heated up by heat exchangne with turbine exhaust gases. After combustion the combustion gases are passed through the open Brayton cycle turbine.

6 Claims, 1 Drawing Figure

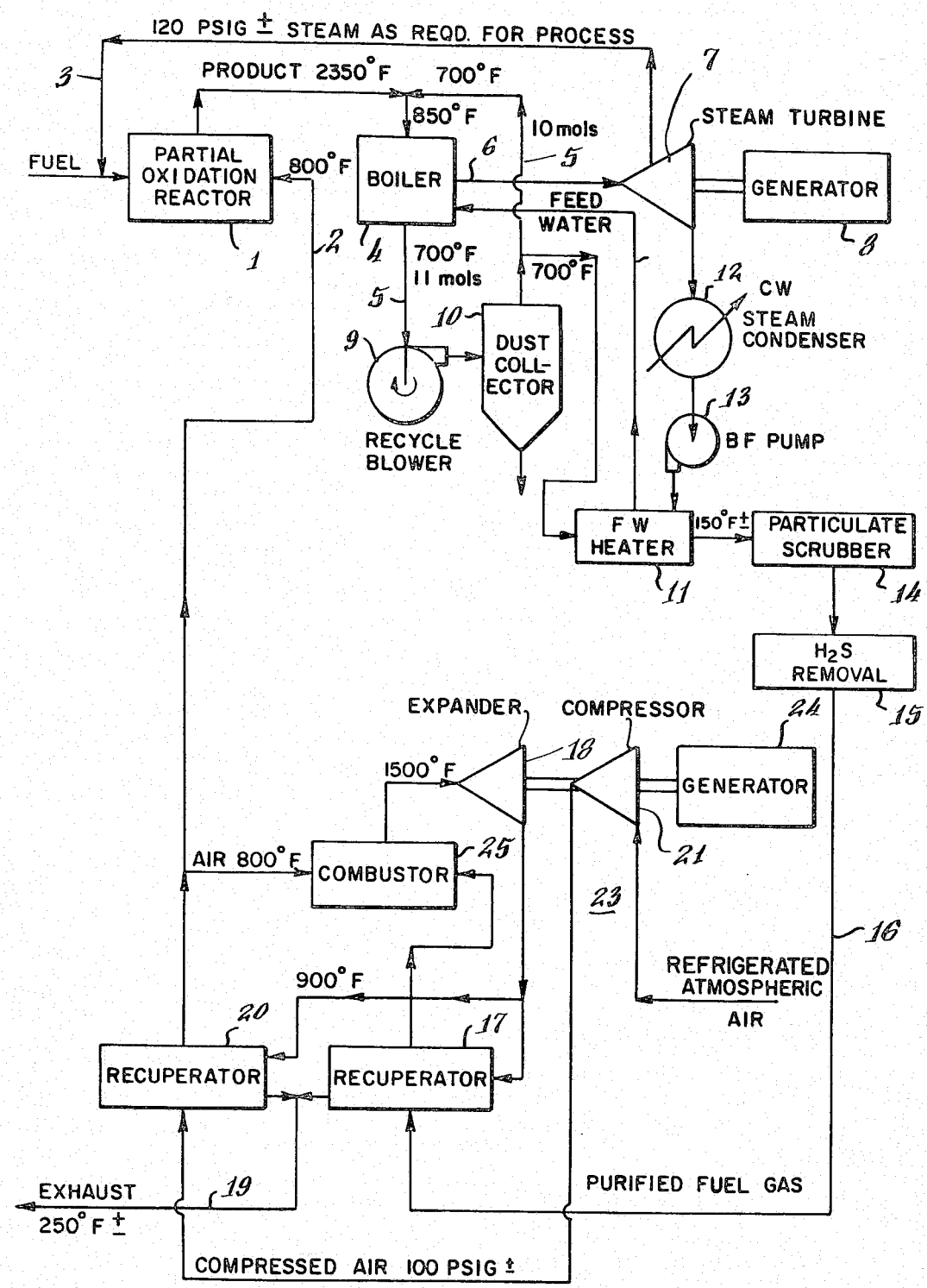

GASIFICATION METHOD WITH FUEL GAS COOLING

RELATED APPLICATIONS

This case is a division of my co-pending application Ser. No. 180,282, filed Sept. 14, 1971, U.S. Pat. No. 3,788,066, which in turn was a continuation-in-part of may applications Ser. Nos. 34,717, filed May 5, 1970, and 44,673, filed June 9, 1970 now abandoned. Ser. No. 34,717 is now U.S. Pat. No. 3,668,884

BACKGROUND OF THE INVENTION

Dirty fuel, such as coal, high sulfur or vanadium containing residual fuel oil, and the like, are not suitable as energy sources in an open Brayton cycle. Particulate matter in the products of combustion at the conditions of temperature in the expander or turbine tends to foul and corrode the metal equipment in the turbine, prohibitively shortening its useful life.

In a closed Brayton cycle dirty fuels could be used to heat the working fluid which is separated from the combustion products by heat conductive metal walls but this is expensive in heat transfer equipment, which is subject to fouling and corrosion from the dirty fuel.

It is known that dirty fuels may be converted by gasification by means of partial combustion, to obtain a gaseous fuel which can be cleaned and purified to produce a fuel suitable for use in an open Brayton cycle. The gasification of the dirty fuel with air, enriched air or oxygen with the addition of steam to reduce carbon formation produces gases at a temperature of at least about 2,200°F., 1,200°C. At this temperature the products, which usually contain hydrogen sulfide and may contain sulfur and other products, are extremely corrosive. The cleaning and purification requires cooling down but the high temperature of the partially combusted gases renders very difficult the recovery of sensible heat of these products. As a result, when dirty fuels are gasified it is usual to quench the hot gases with water prior to scrubbing and cleaning them. Although the clean products obtained as described are suitable fuels for an open Brayton cycle, there is a loss of a considerable portion of the energy in the dirty fuel.

In a closed Brayton cycle using a recirculating working fluid, the problems of contaminants are not quite as acute as in an open Brayton cycle. They do, however, exist because the metal walls of the heat exchanger in which the working gluid is heated up can also be corroded or fouled with particulate matter.

It has also been proposed to gasify dirty fuel, cool it, clean it, and use it for a fuel, but the cooling is effected by using steam. This method is described in the Khristianovich et al. U.S. Pat. No. 3,187,902, Nov. 29, 1966. The cleaned fuel is then used as a fuel for generating steam although there is an incidental mention of the possibility of using it as a fuel in a gas turbine. The sensible heat of the products of gasification is, however, not recovered, except to a minor extent. There is, of course, no mention of other features of the invention which, as will be described, include refrigeration of air compressed for Brayton cycle combustion, heating cool clean gas by heat exchange with Brayton cycle turbine exhaust gases, etc.

It is with an improved Brayton cycle utilizing clean fuel from the gasification of dirty fuel and operating with greatly reduced loss of energy and with improved conversion efficiency that the present invention deals.

SUMMARY OF THE INVENTION

With the production of compounds such as hydrogen sulfide and the like which are corrosive to steels at the temperatures at least as high as the operating temperature of a Brayton cycle gas turbine cooled below corrosive temperatures to steel and cleaned of the chemically corrosive compounds refrigerated intake air to the Brayton cycle compressor and quenching of the excess heat of the gases from the partial combustion of the dirty fuel. None of the individual steps taken by itself out of combination with the others is broadly new.

The dirty fuel, such as high sulfur coal, is gasified, using a portion of the compressed air for the Brayton cycle compressor, preferably heated up by heat exchange with exhaust gases from the Brayton cycle expander or gas turbine. The rest of the air from the compressor is used for combustion for the open Brayton cycle, as will be described. Preferably, some steam is added in the gasification to prevent excessive formation of carbon.

The products of partial combustion are cooled in a pressurized waste heat boiler and boiler feed water heater and are scrubbed and cleaned to remove particulates and sulfur compounds or, in the case of some oils, nickel and vanadium compounds. The cleaned gases then are heated in a section of the regenerator, flowing in parallel with the air from the compressor. The heated cleaned gases are burned with preheated air in the combustors, and the hot products of combustion then undergo expansion in the turbine in the case of an open Brayton cycle or the heat exchanger heating a working fluid in the case of a closed Brayton cycle.

As has been mentioned above, the temperature of the partial combustion gases is sufficiently high so that contaminants, such as hydrogen sulfide, are seriously corrosive. Therefore, it is preferred to cool down the gases to the point at which the contaminants are not corrosive, recover the sensible heat in a waste heat boiler, recycling sufficient of the cooled gases, after removing dust, to mix with the incoming fuel gases from the partial gasification. The boiler generates steam which can be effectively used for any desired purpose. A portion of the cooled gases after further cooling, preferably in a feedwater heater for the waste heat boiler, are scrubbed to remove particulate matter and then treated for the removal of hydrogen sulfide by conventional equipment. The resulting clean fuel gases are then heated by heat exchange with exhaust gases from the Brayton cycle turbine and burned with similarly heated compressed air from the Brayton cycle compressor to furnish the working fluid for an open cycle Brayton gas turbine.

The system of this invention provides unique advantages in efficiency. By refrigeration of the suction air to the compressor, the compressed air to the regenerator is cooler and has a much greater capacity for absorption of waste heat than does equivalently compressed ambient temperature air. The cooled products of fuel gasification offer additional capacity for heat absorption, and as a consequence, the exhaust gases from the regenerator are considerably cooler than in a system that does not regeneratively heat the gasification products.

The purified fuel gases, when used in a Brayton cycle, suffer no disadvantage by having their caloric content so greatly reduced because of dilution by the nitrogen of the partial oxidation air. These fuel gases, when preheated by the waste heat available from the regenerator of the Brayton cycle, have a flame temperature which is considerably higher than that which the Brayton cycle turbine can endure, and excess air is still needed for quenching, although not to the same extent as when higher heat content fuels are used. All of the allowable temperature of the purified low heat content fuel gas is, therefore, effectively used in the Brayton cycle, whereas its relatively low frame temperature makes it uneconomical to use for many other purposes, such as for steam generation. In other words, the refrigerated suction and regenerated air and fuel gas features of the present invention result in being able to use effectively in a Brayton cycle fuel gas of low heat content. It is, however, an advantage that the other features of the present invention can be used with the partial oxidation of dirty fuel, which in a number of cases permits further economies in fuel cost.

At the present time the largest single field for very large Brayton cycle systems, for example from 50 to some hundreds of thousands of kilowatts, is that of electric power generation. Electric power plants are faced with a number of problems: One is that of peak power, which may be required for only a few hours a day and/or a few days a year. Brayton cycle systems can start up quickly and are ideal for peaking power purposes. Another factor is the increasing stringency of regulation for environmental pollution. Stack gas clean-up processes are currently being developed, but they all are expensive, so at present the most satisfactory method of pollution control is to use clean fuels. An open Brayton cycle requires quite clean fuel in any event because some pollutants are intensely corrosive to most metals and other materials in a gas turbine or heat exchangers for the working fluid of a closed Brayton cycle at the temperatures at which the turbine or heat exchanger operates, whereas the same pollutants frequently do not present such severe corrosion problems at the much lower temperatures of the surfaces of steam boilers. Therefore, Brayton cycles, particularly open Brayton cycles, have to use relatively clean fuel regardless of environmental pollution requirements. This has presented an interesting economic factor in the use of Brayton cycle engines in power plants. For environmental reasons the fuels used in any generating plant must be clean, and since Brayton cycle plants, such as open Brayton cycle plants, are usually much cheaper than steam plants, it is common practice in many large central plants to use Brayton cycle plants, which were originally intended for peak power production, for a much longer portion of the year. The increases in Brayton cycle thermal efficiencies and power outputs made possible by the present invention therefore assume great economic importance in this large and growing field.

When the present invention is used for electric power generation, the largest single field at present, as has been set out above, a further refinement is possible and is of practical importance in some cases. Because of the large quantities of incoming air, a relatively large refrigeration system is needed. A unit of refrigeration capacity in such large systems is much more economical than in smaller refrigeration sytems, so that a part of the larger refrigeration system can be used in the present invention for the economical cooling, to a temperature lower than ambient, of the electric generators, transformers and other elements of the electric generating system. This additional cooling usually permits an increase in the capacity of these elements over their rating at ambient temperature conditions. For example, it is common to cool generators with hydrogen, and transformers often use a cooling fluid such as a fluorocarbon. These fluids can be cooled by a portion of the capacity of the large refrigeration system which is used for cooling the incoming air in the Brayton cycle. This utilization of a very small part of the large refrigerating capacity permits the economical sub-ambient cooling and the consequent increase in capacity of generators, transformers, etc. It is also necessary to cool lubricating oil in Brayton cycle turbines, and the same considerations apply as this can be done more economically by the relatively very large refrigeration system necessary in the present invention.

While the use of the large refrigerating system for cooling generators, transformers, and the like can be used in combination with the use of dirty fuel, recovery of sensible heat from the gasification thereof, and refrigerated air intake for the open cycle Brayton compressor, this latter feature alone is not the subject matter of the present invention as it will be described and claimed in another divisional case, which, however, is not limited to clean gases obtained from dirty fuel.

Because of the greater flexibility in plant arrangement, significant economic advantage is obtained when an auxiliary fluid, such as "Dowtherm," is used to transfer regenerated heat from the expander exhaust to the compressor discharge.

BRIEF DESCRIPTION OF THE DRAWING

The drawing shows, in purely diagrammatic form, a system for the use of dirty fuel in a Brayton cycle system.

DESCRIPTION OF THE PREFERRED EMBODIMENT

The drawing illustrates the removal of contaminants from dirty fuel, producing clean fuel for the Brayton cycle engine. Some coals have contaminants of sulfur and particulates, and some oils have sulfur and a few also have small amounts of vanadium and nickel. The drawing is diagrammatic as the particular design of equipment used is not changed by the present invention.

Dirty fuel, either solid or liquid, is partially oxidized in a reactor 1. This reactor receives compressed air at about 100 psig, heated to 800°F., through the pipe 2. The amount of air is restricted so that partial oxidation takes place. Some 100 psig steam is also introduced through the pipe 3 to aid in the gasification or partial oxidation of the fuel. A product gas at about 2,350°F. enters the waste heat boiler 4 after having been mixed with a much larger stream, 10 mols to 1, of cooler product gas from the pipe 5. This results in lowering the temperature of the mixture to about 850°F., as indicated, a temperature which is sufficiently low so that hydrogen sulfide does not corrode the boiler surfaces.

The temperature of the large volume of gases, 11 mols compared to 1 mol coming from the partial oxidation reactor, produces steam, which can be at 1,500 psig with a saturated temperature of 600°F. or it may be superheated if desired. This steam leaves through pipe 6, passes through a steam turbine 7 and generates power, which is symbolized by the generator 8. Some steam is bled out of the turbine at the low pressure stage and is recycled through the pipe 3 to the reactor, as has been described. The process gases leave boiler 4 at about 700°F., pass through the pipe 5, are blown by the blower 9 through a dust collector 10 and then are split, about 1 mol going to a boiler feedwater heater 11, which supplies the boiler with feedwater through the pipe 12, and the larger portion, about 10 mols, passing on through pipe, also numbered 5 for simplicity, to quench the high temperature product gases entering the boiler, as has been described. While the volume recirculated is very large compared to the volume produced by partial oxidation, this recirculation or recycling constitutes a circulating load, and about 1 mol of product gases finally are cooled in the feedwater heater 11.

The exhaust from the steam turbine 7 is condensed in the condenser 12 and pumped by the pump 13 through the feedwater heater 11 back to the boiler 4. Makeup water to compensate for the steam used in the partial oxidation is introduced into the suction of pump 13 in the conventional manner. This additional water, which though needed is not a feature of the present invention, is, therefore, not specifically shown on the drawing.

In the feedwater heater 11 the 750° product gas is cooled to about 150°F. As in many places on the drawing, this is an approximate temperature and is symbolized by the ± symbol. The 150°F. product gases are scrubbed in particulate scrubber 14, where solid material, such as ash, vanadium and nickel compounds and the like, are removed. The scrubber is shown purely diagrammatically as it is a well known piece of equipment and its design is not changed by the present invention. The gases are scrubbed, which results in bringing their temperature down to about ambient, and then pass through a conventional hydrogen sulfide removal plant 15. The drawing shows the situation where the contaminated fuel contains both sulfur and other materials. Where a fuel contains no significant amount of sulfur, of course the plant 15 may be omitted. The purified gas passes through the pipe 16 to a recuperator 17, which is heated by exhaust gases from the Brayton cycle expander 18. The gas is heated up to about 800°F. and the expander exhaust is cooled down to about 250°F., passing out through the exhaust pipe 19.

In parallel with the recuperator 17 is a recuperator 20, which is also fed with a portion of the hot exhaust gases from the expander 18. Through this recuperator, air compressed in the air compressor 21 enters through pipe 23 and is heated up to about 800°F. The expander 18, as is normal, produces power in excess of that required by the compressor 21 and this additional power is obtained as useful work, symbolized by the generator 24. The hot compressed air stream is split, part of it going to the partial oxidation reactor 1 through the pipe 2, as has been described, and part of it into the Brayton cyce combustor 25, where it burns with the fuel gases preheated by the recuperator 17.

It will be seen that the major portion of the energy in the exhaust gases from the expander 18 is effectively used in preheating air and fuel for the Brayton cycle combustor and partial oxidation reactor. The only significant energy losses are in the exhaust pipe 19, which exhausts at a very much lower temperature than from an ordinary Brayton cycle expander, and a small amount lost in the particulate scrubber 14. Steam at a useful pressure and temperature is produced economically by the waste heat boiler 4 from the large volume of quenched process gases, and the boiler operates reliably since the inlet process gas temperature is brought down to a low enough figure to prevent damage to the heating surfaces of the boiler. This quenching, as has been described, does not result in any loss of heat because the sensible heat of the large volume of gases going through the boiler is practically all effectively utilized in raising steam.

The drawing illustrates the combination of recycling a large amount of cooled partially oxidized gases in order to bring down the temperature in the boiler 4. With certain contaminants the relatively cool surfaces in the waste heat boiler 4 can tolerate a higher temperature, and where this is possible, part or all of the recycling of the cooled gases may be omitted.

The drawing also illustrates the combination of cleaning dirty fuel with an open Brayton cycle system. It is particularly useful with such a system when refrigerated suction of the present invention is used. However, the same partial oxidation and cleaning of the dirty fuel may be used with a closed Brayton cycle.

The present invention preferably includes the use of refrigerated air in the intake of the compressor 21. The advantages in increased efficiency can be illustrated as follows: The work produced by the air expander of a 5.4 ratio simple Brayton cycle engine is about 2.77 times the net work output of the engine, and when the compressor takes suction at ambient temperature (for example 100°F.) the work consumed by the air compressor is about 1.77 times the net work output. If the ambient temperature air is refrigerated before it enters the compressor, the work output of this Brayton cycle engine increases because the compression ratio increases, and the expansion ratio increases accordingly; the work produced by the air expander therefore increases; and also because the mass flow of air through the engine increases, due to the greater density of the cold air. The work which is required to refrigerate the inlet air must, of course, be deducted from the work which is produced by the Brayton cycle engine, but even when an inefficient single stage refrigeration system is used, the refrigerated suction engine delivers more usable shaft work than does the same engine if it takes suction at ambient temperature.

Similar advantages result from refrigerating the suction of a closed Brayton cycle engine, wherein the working fluid may be dry, and is heated indirectly in an external heat exchanger.

I claim:

1. In a Brayton cycle including air compression, combustion, and combustion gas expansion in an expander, such as a gas turbine, the improvement which includes, in combustion,
   a. heating the compressed air,
   b. gasifying dirty fuel with a portion of heated compressed air, said fuel on gasification comprising contaminants which are chemically corrosive to steel at temperatures at least as low as the operating temperature of the expander,
   c. cooling and purifying the gasified fuel by removing said chemically corrosive contaminants, the cooling being effected at least in a major degree by mixing a portion of the cooled gasified fuel with the uncooled gasified fuel, d. combusting the thus purified gasified fuel with a second portion of the heated compressed air, and
e. expanding the products of combustion in the expander.

2. A Brayton cycle system according tp claim 1 in which the air to be compressed is refrigerated.

3. A Brayton cycle according to claim 1 in which the gases from the gasified dirty fuel are reduced in temperature to the point where the said contaminants do not chemically corrode steel and are passed through a waste heat boiler to generate steam, resulting in cooling the gases, and then purifying the cooled gases by removing said contaminants.

4. A Brayton cycle according to claim 2 in which the gases from the gasified dirty fuel are reduced in temperature to the point where the said contaminants do not chemically corrode steel and are passed through a waste heat boiler to generate steam, resulting in further cooling the gases, and then purifying the cooled gases by removing said contaminants.

5. A Brayton cycle system according to claim 3 in which the cooling of the gases from gasifying the dirty fuel is effected by mixing with cooled gases from the waste heat boiler whereby all of the heat in the gases from partial combustion of the dirty fuel is transformed into sensible heat at a lower temperature and at least some of the sensible heat is utilized for the generation of steam in the waste heat boiler.

6. A Brayton cycle system according to claim 4 in which the cooling of the gases from gasifying the dirty fuel is effected by mixing with cooled gases from the waste heat boiler.

* * * * *